(No Model.)
A. A. STROHECKER & J. HUTTON.
APPARATUS FOR APPLYING ICING TO PASTRY.
No. 531,398. Patented Dec. 25, 1894.
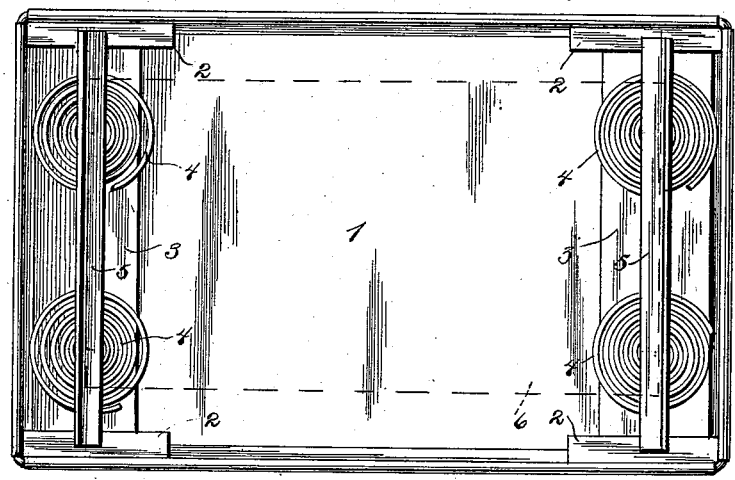
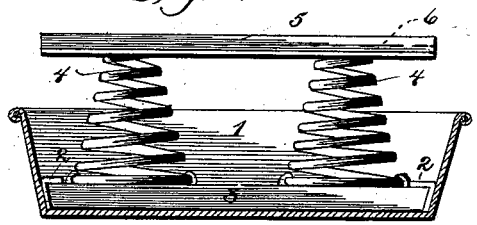
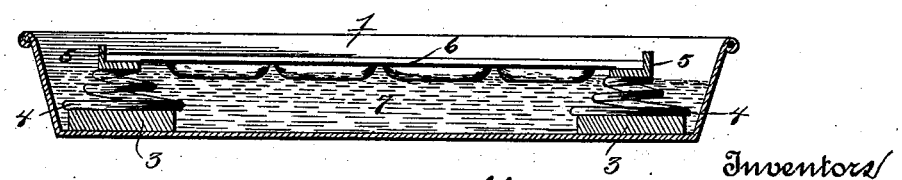

UNITED STATES PATENT OFFICE.

ALBERT A. STROHECKER AND JOHN HUTTON, OF TRENTON, NEW JERSEY; SAID HUTTON ASSIGNOR TO SAID STROHECKER.

APPARATUS FOR APPLYING ICING TO PASTRY.

SPECIFICATION forming part of Letters Patent No. 531,398, dated December 25, 1894.

Application filed October 6, 1894. Serial No. 525,137. (No model.)

*To all whom it may concern:*

Be it known that we, ALBERT A. STROHECKER and JOHN HUTTON, citizens of the United States, residing at Trenton, in the county of Mercer and State of New Jersey, have invented certain new and useful Improvements in Apparatus for Applying Icing to Pastry; and we do declare the following to be a full, clear, and exact description of the invention, such as will enable others skilled in the art to which it appertains to make and use the same.

Our invention has relation to confectionery, and has for its object to provide a simple and inexpensive means whereby icing may be quickly applied to the outer surface of pastry, more particularly small cakes and the like.

With the above objects in view our invention consists in the novel construction and arrangement of parts as hereinafter fully described, set forth in the claim, and pointed out in the drawings, in which—

Figure 1 is a top plan view of our device. Fig. 2 is a transverse sectional view taken through the center of Fig. 1. Fig. 3 is a longitudinal sectional view showing the device while in operation, the receptacle being partially filled with icing and the outer surface of the cakes on the bottom of the baking pan being in contact with the icing.

In carrying out our invention, we employ a suitable pan or receptacle 1, of any desired size or shape, provided interiorly at each of its ends with flanges running longitudinally with the pan and forming guide-ways 2. Working within said guide-ways is a strip 3 having mounted thereon springs 4 carrying angle-supports 5, adapted to support the ordinary baking pan 6.

The operation of our device may be briefly described as follows: In baking small cakes and similar articles of pastry it will be found that when the pan is taken from the oven the cakes will stick or adhere to the bottom of the pan. Heretofore it has been customary to loosen the cakes from the pan and apply the icing by hand. Instead of this, we allow the cakes to remain fastened to the pan and carry the pan to my device, which has been previously filled with icing, move the strip 3 along the guide-ways 2 until the angle-supports 5 are the proper distance apart to receive the ends of the pan 6. We then turn the pan bottom side up and place it so that its ends will rest on the angle-supports 5. We then compress the springs 4 by pressing firmly on the bottom of the pan until the surface of the cakes 7 comes in contact with the icing contained in the pan, when the said icing will quickly apply itself to the entire surface of the cakes. After this has been done, the pan is lifted from the angle-supports and laid aside until we are ready to remove the cakes.

If the first operation does not sufficiently coat the surface of the cakes, we repeat the procedure described until the icing is of the desired thickness.

In practice our invention will be found invaluable for the purpose named; and is equally well adapted for use in applying jelly, ground cocoa-nut and similar substances to the surface of pastry.

Having thus described our invention, what we claim, and desire to secure by Letters Patent, is—

A device for applying icing to cakes, &c., consisting of a pan or receptacle having flanges approximately at its inner corners, slides, springs mounted on said slides and angle supports carried by said springs, substantially as set forth.

In testimony whereof we affix our signatures in presence of two witnesses.

ALBERT A. STROHECKER.
JOHN HUTTON.

Witnesses:
JOANNA M. KRUMHOLZ,
LACIE KRUMHOLZ.